United States Patent
Xiang et al.

(10) Patent No.: US 9,313,697 B2
(45) Date of Patent: Apr. 12, 2016

(54) OPTIMIZED OFFLOADING TO WLAN IN 3GPP-RAT MOBILITY

(71) Applicant: FutureWei Technologies, Inc., Plano, TX (US)

(72) Inventors: Zhixian Xiang, Plano, TX (US); Wenruo Zhu, Shanghai (CN); Weisheng Jin, Shenzhen (CN); Xiaobo Wu, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 144 days.

(21) Appl. No.: 14/153,311

(22) Filed: Jan. 13, 2014

(65) Prior Publication Data

US 2014/0204904 A1 Jul. 24, 2014

Related U.S. Application Data

(60) Provisional application No. 61/754,295, filed on Jan. 18, 2013.

(51) Int. Cl.
*H04W 4/00* (2009.01)
*H04W 36/00* (2009.01)

(52) U.S. Cl.
CPC ............ *H04W 36/0066* (2013.01); *Y02B 60/50* (2013.01)

(58) Field of Classification Search
None
See application file for complete search history.

(56) References Cited

U.S. PATENT DOCUMENTS

| 7,773,571 B1 * | 8/2010 | Maxwell ........... H04W 36/0033 370/338 |
| 2010/0003980 A1 | 1/2010 | Rune et al. |
| 2010/0323698 A1 | 12/2010 | Rune et al. |
| 2011/0110300 A1 | 5/2011 | Sachs et al. |
| 2012/0069817 A1 | 3/2012 | Ling et al. |

(Continued)

FOREIGN PATENT DOCUMENTS

| CN | 101981976 A | 2/2011 |
| CN | 102007800 A | 4/2011 |

OTHER PUBLICATIONS

3GPP TR 23.853 V12.0.0, "3rd Generation Partnership Project; Technical Specification Group Services and System Aspects; Operator Policies for IP Interface Selection (OPIIS)," Technical Report, Release 12, Dec. 2012, 17 pages.

(Continued)

*Primary Examiner* — Kiet Tang
(74) *Attorney, Agent, or Firm* — Slater & Matsil, L.L.P.

(57) ABSTRACT

System and method embodiments are provided for optimizing offloading wireless services to a WLAN in 3GPP-RAT mobility. The embodiments enable changing network priority based on changing network conditions. In an embodiment, a method in a user equipment (UE) for offloading wireless services to a wireless local area network (WLAN) in a Third Generation Partnership Project (3GPP) inter-radio access technology (RAT) handover includes receiving an access network discovery and selection function (ANDSF) policy from an ANDSF server, wherein the ANDSF policy comprises policy rules including a validity condition, wherein the receiving is performed during a procedure in which the UE conducts an inter-RAT handoff from a first 3GPP RAT to a second 3GPP RAT; comparing evaluation condition information for the second 3GPP RAT against the validity condition; and offloading a first wireless service to the WLAN in accordance with the ANDSF policy when the validity condition is satisfied.

18 Claims, 6 Drawing Sheets

(56) References Cited

U.S. PATENT DOCUMENTS

2013/0208696 A1* 8/2013 Garcia Martin ...... H04W 36/32
370/331
2013/0286946 A1 10/2013 Zisimopoulos
2014/0079022 A1* 3/2014 Wang .................... H04W 48/08
370/331

OTHER PUBLICATIONS

3GPP TS 24.312 V11.5.0, "3rd Generation Partnership Project; Technical Specification Group Core Network and Terminals; Access Network Discovery and Selection Function (ANDSF) Management Object (MO)," Release 11, Dec. 2012, 173 pages.

3GPP TS 23.402 V11.5.0, 3rd Generation Partnership Project; Technical Specification Group Services and System Aspects; Architecture Enhancements for Non-3GPP Accesses, Release 11, Dec. 2012, 252 pages.

International Search Report and Written Opinion of the International Searching Authority received in Patent Cooperation Treaty Application No. PCT/CN2014/070898, mailed Apr. 22, 2014, 11 pages.

"3rd Generation Partnership Project; Technical Specification Group Services and Systems Aspects; Optimized Offloading to WLAN in 3GPP-RAT Mobility; (Release 12)," 3GPP TR 23.890 V0.2.0, Oct. 2012, 8 pages.

"WiFi Optimized Offloading in 3GPP RAT Mobility," 3GPP Draft; S2-121455, 3rd Generation Partnership Project (3GPP), Mobile Competence Centre, Apr. 16, 2012, 16 pages.

* cited by examiner

OPTIMIZED OFFLOADING TO WLAN IN 3GPP-RAT MOBILITY

CROSS-REFERENCE TO RELATED APPLICATIONS

The present application claims the benefit of U.S. Provisional Patent Application No. 61/754,295 filed Jan. 18, 2013 and entitled "System and Method for Cellular to WLAN Offloading," which is incorporated herein by reference as if reproduced in its entirety.

TECHNICAL FIELD

The present invention relates to a system and method for wireless communications, and, in particular embodiments, to a system and method for cellular to WLAN offloading.

BACKGROUND

When a user equipment (UE) conducts a Third Generation Partnership Project (3GPP) inter-radio access technology (RAT) handover, it does not know the target RAT network capability until it complete the power save (PS) handover procedure. If the target RAT, such as Global System for Mobile Communications (GSM) enhanced data rates for GSM evolution (EDGE) radio access network (GERAN), cannot support certain internet protocol (IP) capability, the UE has to start WLAN or WiFi and then move the IP flow to WiFi, which takes a longer time and detrimentally impacts the user's experience. There is no mechanism for the UE to obtain 3GPP RAT network capability information before actual inter-RAT handover occurs.

In current access network discovery and selection function (ANDSF) policy, the validity conditions that indicate the conditions under which the policy should be applied are limited, such as only time and location. The condition is not associated with the services.

For the current ANDSF mechanism, the policy is applied before the UE makes the selection. There is no mechanism for the UE to reselect another network after the selection is made in case the selected network is not suitable after connection. For example, if a policy is that long term evolution (LTE) is always preferred over WiFi, but LTE 1, to which the UE is connected, is overloaded at this time, so WiFi needs to be considered as preferred over LTE.

SUMMARY

In accordance with an embodiment, a method in a user equipment (UE) for offloading wireless services to a wireless local area network (WLAN) in a Third Generation Partnership Project (3GPP) inter-radio access technology (RAT) handover includes receiving at the UE an access network discovery and selection function (ANDSF) policy from an ANDSF server, wherein the ANDSF policy comprises policy rules, wherein the policy rules comprise a validity condition for applying the policy rules, and wherein the receiving the ANDSF policy is performed during a procedure in which the UE conducts an inter-RAT handoff from a first 3GPP RAT to a second 3GPP RAT; comparing with the UE an evaluation condition information for the second 3GPP RAT against the validity condition; and offloading a first wireless service to the WLAN in accordance with the ANDSF policy when the validity condition is satisfied.

In accordance with an embodiment, a user equipment (UE) configured for offloading wireless services to a wireless local area network (WLAN) in a Third Generation Partnership Project (3GPP) inter-radio access technology (RAT) handover includes a processor and a computer readable storage medium storing programming for execution by the processor, the programming including instructions to: receive an access network discovery and selection function (ANDSF) policy from an ANDSF server, wherein the ANDSF policy comprises policy rules, wherein the policy rules comprise a validity condition for applying the rules, and wherein the instructions to receive the ANDSF policy is performed during a procedure in which the UE conducts an inter-RAT handoff from a first 3GPP RAT to a second 3GPP RAT; compare evaluation condition information determined for the second 3GPP RAT against the validity condition; and offload a first wireless service to the WLAN in accordance with the ANDSF policy when the validity condition is satisfied.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
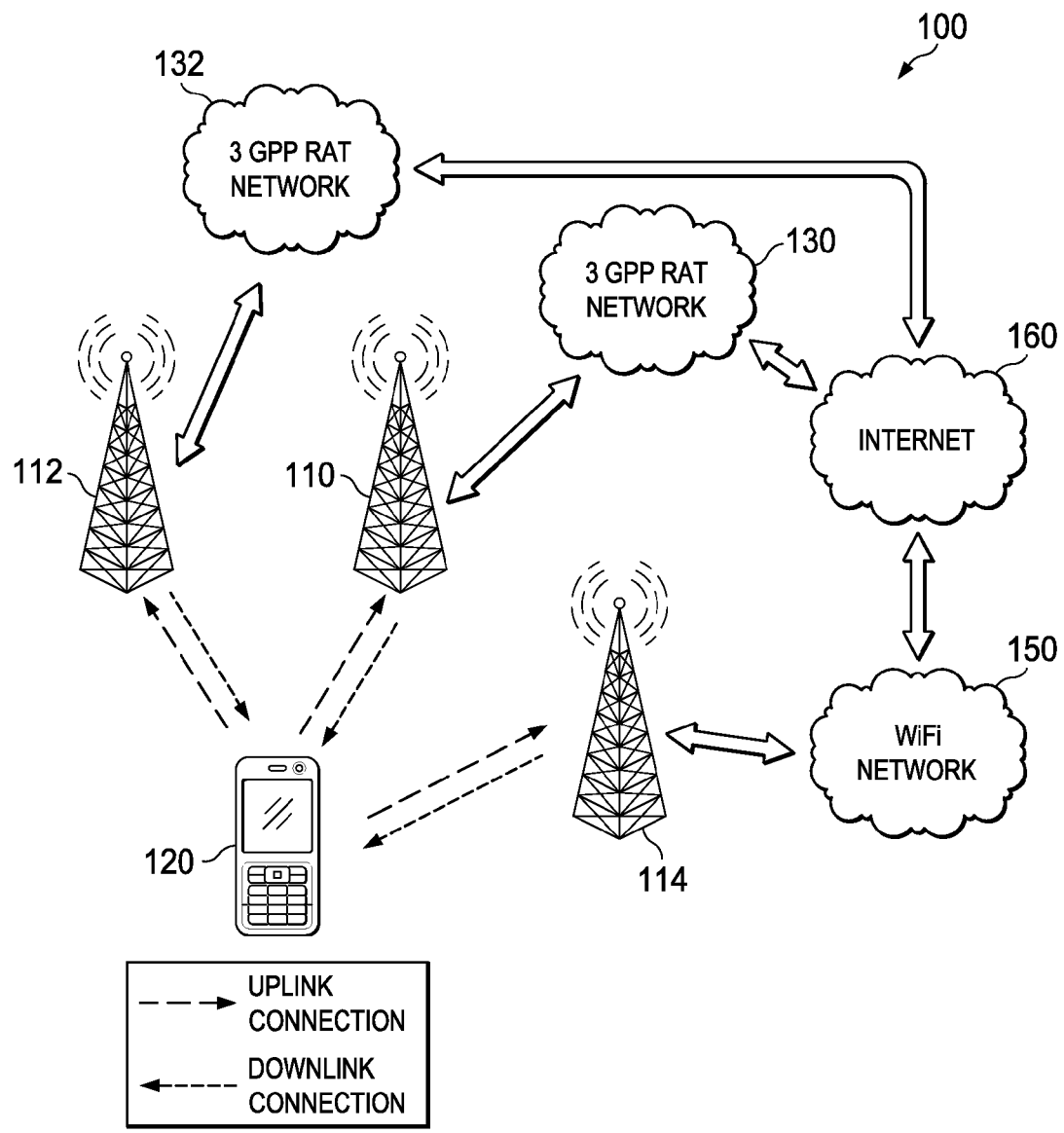
FIG. 1 illustrates a network for communicating data.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The current ANDSF policy preference network list is static and mainly for initial network selection, so after a UE selects one higher priority network based on the policy, that network generally always has higher priority even if the quality of the network is degrading. There is no mechanism to indicate the change of the network priority based on the changing condition.

An embodiment provides optimized offloading to WLAN in 3GPP RAT mobility. As used herein, the term "offloading" refers to using a different service, such as a WLAN, for a particular service (e.g., video streaming, data transfer, etc.) rather than the 3GPP RAT network. An embodiment makes minimal impact on existing terminal implementation. An embodiment simplifies terminal implementation and saves terminal operational power and memory consumption, which lead to lower terminal cost. An embodiment helps keep network signaling overhead low. An embodiment does not need to create a new routing policy routing container (inter_APN routing policy). An embodiment makes APN and IPflow mapping more dynamic based on existing interface routing policy. An embodiment may be implemented in 3GPP SA2 specification (23.853), CT 24.402, 24.312. An embodiment may be implemented in wireless network systems and devices, such as WiFi access points (APs), ANDSF server, WiFi+cellular dual mode terminals, and the like.

An embodiment implements 3GPP RAT network condition information into access network discovery information (ANDI), such as dual transfer mode (DTM) support, resource or service support capability to the UE. Therefore the UE can know these conditions before inter-RAT mobility and prepare accordingly, such as turning on WiFi and establishing a WiFi connection in parallel with 3G inter-RAN handover. 3G RAT network information can be, for example, DTM capability for GERAN, connection capability (supported port), quality of service (QoS) class identifier (QCI) support capability, other 3GPP policy and charging control (PCC) capability, such as guaranteed bit rate (GBR), maximum bit rate (MBR), aggregate MBR (AMBR), and the like.

An embodiment implements new validity conditions into inter-system routing policy (ISRP), inter-system mobility policy (ISMP) with 3GPP RAT information, such as DTM support, service support capability, etc., to trigger the UE to quickly move IP flow from 3GPP RAT to WiFi if the validity condition for 3G RAT is not met after 3G inter-RAT mobility procedure is complete. The validity conditions may be: DTM support for GERAN, connection capability support, QCI support capability, e.g., data loss rate>xx %, packet delay<xxx ms, other 3GPP QoS capability, such GBR, MBR, AMBR, duration within the selected network before considering a move to another network, and so on.

An embodiment implements a dynamic preferred technology list with an evaluation period validity condition (also referred to herein as an evaluation condition) for a policy rule. When the evaluation period complete, and the first preferred technology is not suitable, the UE either starts a new network selection with the previous connect network of lower priority, or moves to a second priority network in the routing rule. Or the UE applies another priority list within the same rule.

An embodiment implements a validity condition inside the policy rule that evaluates the network after the UE connects to the network. In an embodiment, it includes an evaluation period (option), and evaluation criteria (mandatory). The evaluation criteria may include whether some service is supported, such as if certain QoS requirements are met. Currently defined validity conditions in ANDSF are only applied before the UE selects the network, but not after.

Alternatively, an embodiment implements an evaluation period within an existing validity condition for each policy rule, which indicates whether this policy will or will not be applied if the condition is met or not met after the evaluation period.

In an embodiment, a method in a user equipment (UE) for offloading wireless services to a wireless local area network (WLAN) in a Third Generation Partnership Project (3GPP) inter-radio access technology (RAT) handover includes receiving at the UE an access network discovery and selection function (ANDSF) policy from an ANDSF server, wherein the ANDSF policy comprises a policy rule, wherein the policy rules include a validity condition for applying the rules, and wherein the receiving the ANDSF policy is performed during a procedure in which the UE conducts an inter-RAT handoff from a first 3GPP RAT to a second 3GPP RAT, comparing with the UE evaluation condition information for the second 3GPP RAT against the validity condition, and offloading a first wireless service to the WLAN in accordance with the ANDSF policy when the validity condition is satisfied. The first and second 3GPP RATs may comprise different capabilities and/or different technologies (e.g., different RAT technologies). In an embodiment, the first and/or second 3GPP RATs is a Global System for Mobile Communications (GSM) enhanced data rates for GSM evolution (EDGE) radio access network (GERAN) or a universal mobile telecommunications system (UMTS) terrestrial RAN (UTRAN). The method may also include determining whether a suitable WLAN network is available suspending the first service until a suitable WLAN network is available or until an inter-RAT handoff to a third 3GPP RAT that is capable of performing the first wireless service is performed. In an embodiment, when a suitable WLAN network is not available, the UE uses the second 3GPP RAT to which the UE is handed off for the first wireless service. In an embodiment, the method also includes switching the first service from the WLAN to one of the second 3GPP RAT, a second WLAN, and a third 3GPP RAT to which the UE is connected after a second inter-RAT handoff if a second validity condition is satisfied. Examples of a validity condition includes a quality of service (QoS) requirement, a RAT capability requirement, connection capability support, quality of service (QoS) class identifier (QCI) support capability, 3GPP policy and charging control (PCC) capability, (QCI) support capability, guaranteed bit rate (GBR), maximum bit rate (MBR), aggregate MBR (AMBR), dual transfer mode (DTM) support, and duration within a selected network before considering a move to another network. In an embodiment, the policy rule specifies an order of preference for wireless access technologies for the first wireless service. Examples of wireless services include video streaming, audio streaming, data service, texting service, and voice call service. The evaluation condition information may be determined from or calculated according to information received from the second 3GPP RAT or it may be received from one of the first or second 3GPP RAT.

FIG. 1 illustrates a network 100 for communicating data. The network 100 comprises a plurality of access points (APs) 110, 112, 114, a user equipment (UE) 120, a plurality of 3GPP RAT networks 130, 132, a WiFi Network, and the Internet 160. As used herein, the term AP may also be referred to as a transmission point (TP), a base station (BS), or a base transceiver station (BTS), and the terms may be used interchangeably throughout this disclosure. The APs 110, 112, 114 may comprise any component capable of providing wireless access by, inter alia, establishing uplink (dashed line) and/or downlink (dotted line) connections with the UEs 120, such as a base transceiver station (BTS), an enhanced base station (eNB), a femtocell, and other wirelessly enabled devices. The UE 120 may comprise any component capable of establishing a wireless connection with the APs 110, 112, 114. For example, the UE 120 may be a smartphone, a laptop computer, a tablet computer, a wireless telephone, etc. The UE 120 may also be referred to as wireless devices, mobile devices, or wireless mobile devices. The 3GPP RAT networks 130, 132 and the WiFi network 150 (i.e., a Wireless local area network (WLAN))may be any component or collection of components that allow data to be exchanged between the APs 110, 112, 114 and the Internet 160 or other remote end (not shown). The two 3GPP RAT networks 130, 132 may have different capabilities. In some embodiments, the network 100 may comprise various other wireless devices, such as relays, femtocells, etc.

As UE 120 travels from the coverage area of AP 110 to AP 112, a handoff from AP 110 to AP 112 occurs. During the handoff, 3GPP RAT network condition information from 3GPP RAT network 132 is provided into the Access network discovery information (ADNI). In an embodiment, the 3GPP RAT network 132 condition information may include DTM capability for GERAN, connection capability, QCI support capability, and other 3GPP PCC capability, such as, for example, GBR, MBR, and AMBR. If the UE 120 is transmitting and/or receiving IP traffic from the Internet 160, the UE can determine the condition of the new 3GPP RAT network 132 to which communication is being handed over to before inter-RAT mobility and prepare accordingly. Preparations can include turning on a WiFi transceiver and establishing a WiFi connection with WiFi network 150 through AP 114 in parallel with the 3G inter-radio access network (RAN) handover. Thus, if the new 3GPP RAT network 132 is not capable of handling the IP communications or has inferior service, the UE 120 can move its IP flow to the WiFi network 150 without waiting for completion of the inter-RAT handover and waiting to discover that the service performance over the new 3GPP RAT network 132 is poor.

Figure 2:
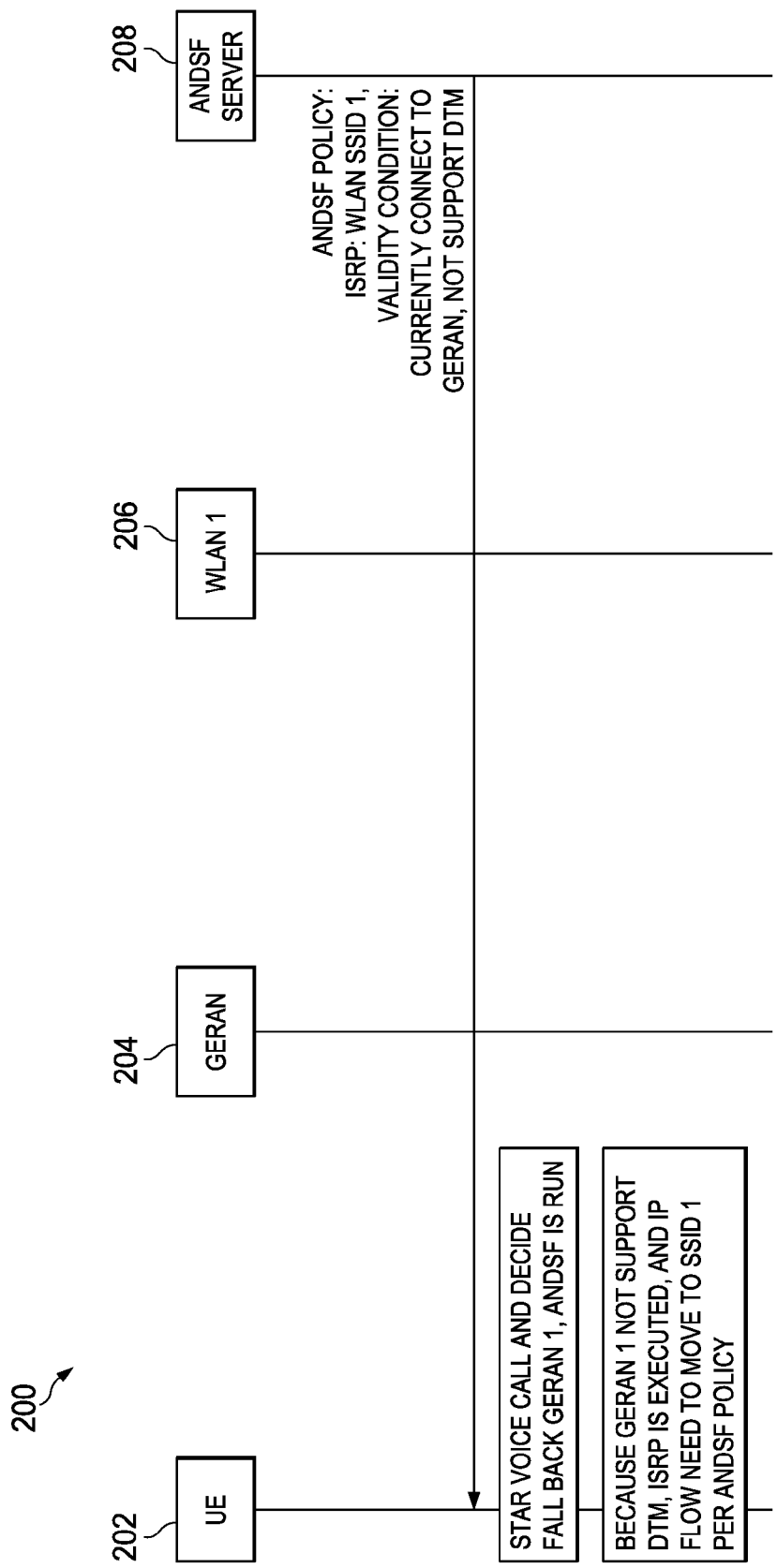
FIG. 2 illustrates a first example embodiment method for IP offloading to a WLAN in 3GPP RAT mobility with a GERAN network.

FIG. 2 illustrates a first example embodiment method 200 for IP offloading to a WLAN in 3GPP RAT mobility with a GERAN network. Method 200 begins with an ADNSF server 208 transmitting an ANDSF policy to UE 202. The ANDSF policy includes an ISRP and a validity condition. In this example, the ISRP is WLAN SSID 1 and the validity condition is when currently connected to a GERAN that does not support DTM, execute the ISRP. Next, the UE 202 starts a voice call and decides on fall back GERAN 1. The UE 202 also runs the ANDSF. Because the GERAN 1 does not support DTM, the ISRP is executed and the IP flow is moved to SSID 1 per ANDSF policy. The UE enables WiFi and establishes a WiFi connection with WLAN 206 in parallel with the inter-RAT handover to GERAN 1 (not shown) from GERAN 204. If WiFI connection is established, as soon as UE is connected to the GERAN, the UE 202 immediately moves the IP flow to the WiFi through WLAN 206. The voice portion of UE 202 communication is still on GERAN 1 after the inter-RAT handover while the data traffic is established in WiFI.

Figure 3:
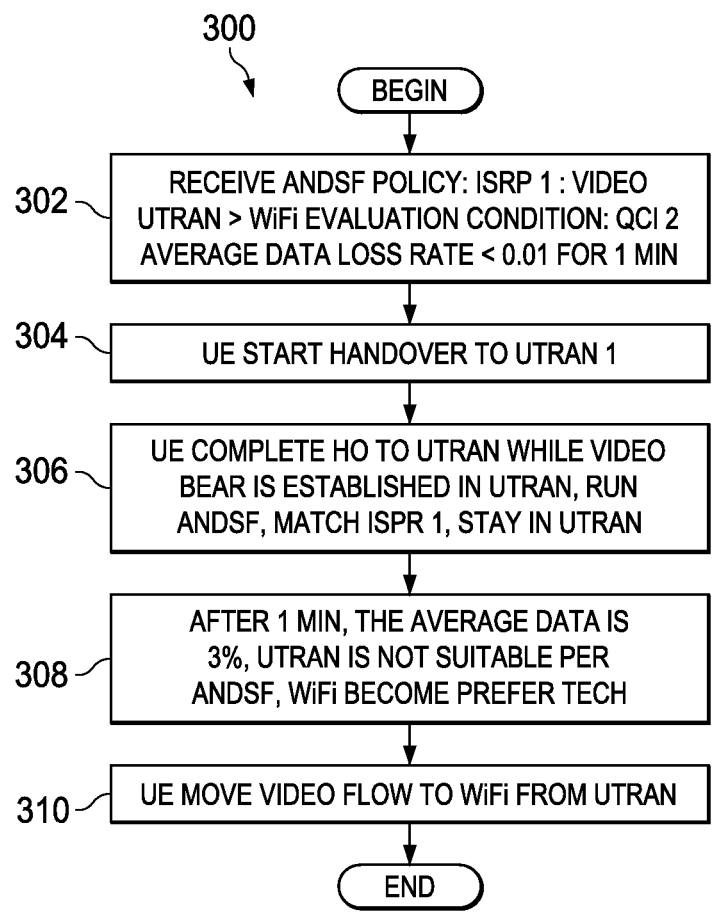
FIG. 3 illustrates a flowchart of an embodiment method for offloading of data traffic to WLAN in 3GPP RAT mobility with a universal mobile telecommunications system (UMTS) terrestrial RAN (UTRAN) network.

FIG. 3 illustrates a flowchart of an embodiment method 300 for optimized offloading of data traffic to WLAN in 3GPP RAT mobility with a universal mobile telecommunications system (UMTS) terrestrial RAN (UTRAN) network. The method 300 begins at block 302 where the UE receives the ANDSF policy. In an embodiment, the ANDSF policy specifies ISRP 1: video traffic is preferably transmitted over UTRAN with a secondary method over WiFi. The evaluation condition specifies QCI 2 with an average data loss rate less than 0.01 (i.e., less than 1%) for 1 minute. At block 304, the UE starts the handover to UTRAN 1. At block 306, the UE completes the handover (HO) to UTRAN 1 while video bear (i.e., a dedicated connection for video traffic) is established in UTRAN. Additionally, the UE runs the ANDSF and if a match ISPR 1 is satisfied, the UE stays in UTRAN. At block 308, after 1 minute, the average data loss is 3%, therefore, the UE determines that the UTRAN is not suitable per ANDSF and WiFi becomes the preferred technology for video communication. At block 310, in response to the determination in block 308, the UE moves the video flow from the UTRAN to WiFi, after which, the method 300 ends.

Figure 4:
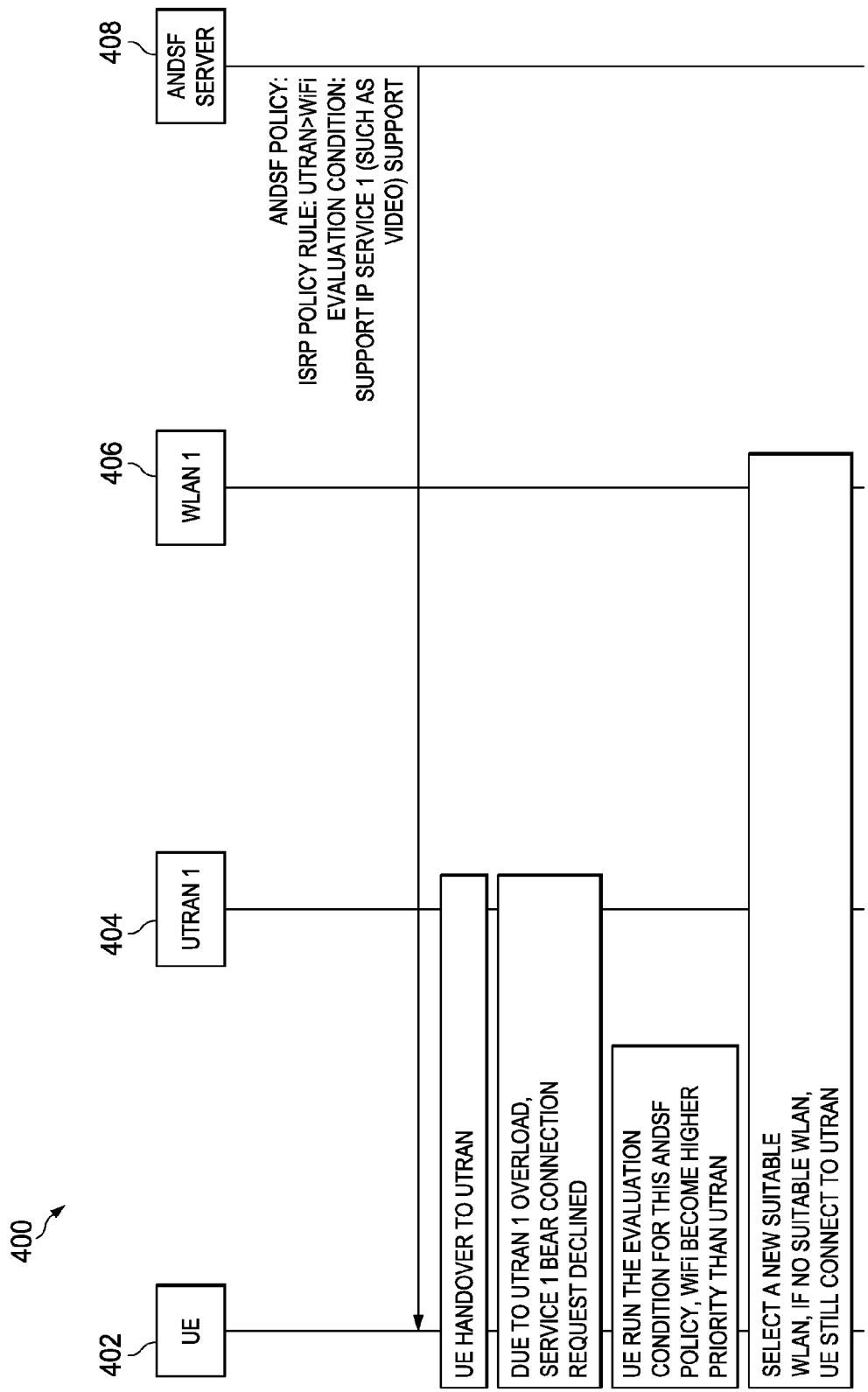
FIG. 4 illustrates an example embodiment method for offloading of data traffic to WLAN in 3GPP RAT mobility with a UTRAN network.

FIG. 4 illustrates an example embodiment method 400 for optimized offloading of data traffic to WLAN in 3GPP RAT mobility with a UTRAN network. The method 400 begins with the UE 402 receiving an ANDSF policy from the ANDSF server 408. The ANDSF policy includes an ISRP policy rule(s) and a validity condition(s). The ISRP policy rule specifies that UTRAN is preferred to WiFi with WiFi as a secondary choice. The validity condition indicates that the UTRAN 1 404 should be evaluated as to whether it supports IP service 1 (such as video), where the numerical value "1" is just used to indicate a certain service. For example, some service providers or operators may provide an index number for certain services, such as "1" for voice, "2" for HD video, etc. The UE 402 then completes a handover to UTRAN 1 404 from another UTRAN. However, due to UTRAN 1 404 overload, the service 1 bear connection request is declined. The UE 402 then runs the validity condition for this ANDSF policy and WiFi becomes a higher priority than UTRAN. Thus, the UE 402 then selects a new suitable WLAN (e.g., WLAN 1 406). If no suitable WLAN is discovered, UE 402 will still attempt to connect to UTRAN 1 404.

Figure 5:
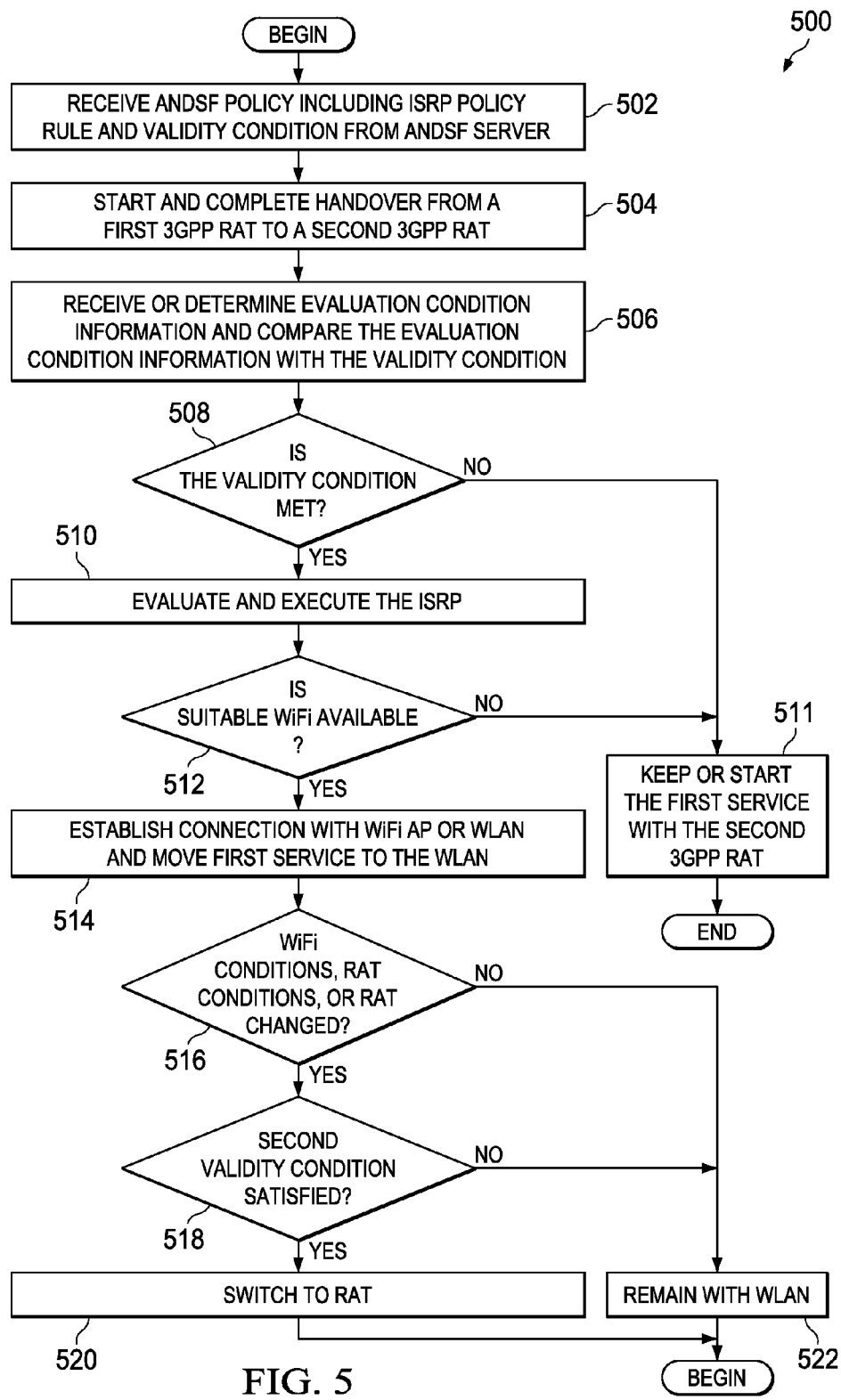
FIG. 5 shows a flowchart illustrating an embodiment method for wireless service offloading to a WLAN in 3GPP RAT mobility.

FIG. 5 shows a flowchart illustrating an embodiment method 500 for wireless service offloading to a WLAN in 3GPP RAT mobility. The method 500 begins in block 502 where the UE receives an ANDSF policy from an ANDSF server. The ANDSF policy includes an ISRP policy rule and at least one validity condition. The ISRP policy rule specifies the order of preferences for technology used to access a service. For example, the rule may specify that a UTRAN should be the preferred choice to use for receiving video with a WLAN as the secondary choice. The rule may specify more than two alternatives and there may be different rules for different services (e.g., video, audio, voice, text, data, etc.). The validity condition specifies conditions that should be satisfied before switching between two or more alternatives for the technology used for a particular service. There may be more than one validity condition included in the ANDSF policy. There may also be more than one rule in the ANDSF policy. For example, there may be a first evaluation condition used to determine whether to offload a service to WLAN and there may be a second validity condition, once the service has been offloaded to the WLAN, to determine whether to move the service back to a 3GPP RAT or to another wireless service (e.g., a different WLAN, a different 3GPP RAT, etc.). Next, the method 500 proceeds to block 504 where the UE starts and completes a handover process from a first 3GPP RAT to a second 3GPP RAT. At block 506, the UE receives, calculates, or otherwise determines evaluation condition information and compares the evaluation condition information with the validity condition. The evaluation condition information may be information received from the second 3GPP RAT or some other component within the network or it may be determined based on processing information received from the 3GPP RAT. For example, if the validity condition specifies that video service should be performed using the 3GPP RAT when package loss rate during a specified time period is less than a specified percentage, then the UE calculates or determines the evaluation condition information by determining the percentage package loss rate during the specified time period.

At block 508, the UE determines whether the validity condition is satisfied by the evaluation condition information. If, at block 508, the UE determines that the validity condition is not met, then the method 500 proceeds to block 510 where the first service is started (or continued if already started) on the second 3GPP RAT, after which, the method 500 ends. If, at block 508, the UE determines, that the validity condition is satisfied, the method 500 proceeds to block 511 where the UE evaluates and executes the ISRP. Assuming that the ISRP specifies that a first service should be offloaded to a WiFi, the method 500 proceeds to block 512 where the UE determines whether a suitable WiFi is available. If, at block 512, a suitable WiFi or WLAN is not available, then the method 500 proceeds to block 510 where the first service is started on (or continued on) the second 3GPP RAT. If, at block 512, a suitable WiFi is discovered, the method 500 proceeds to block 514 where the UE establishes a connection with the WiFi AP or WLAN and moves the first service to the WiFi or WLAN.

In an embodiment, at block 516, the method 500 optionally determines whether WiFi conditions, RAT conditions, or the RAT to which the UE is connected have changed. If, at block 516, the conditions have not changed, the method 500 proceeds to block 522 where the UE keeps the first service with the WLAN, after which, the method 500 ends. If, at block 516, the conditions have changed, the method proceeds to block 518 where the UE determines whether a second validity condition is satisfied. If, at block 518, the second validity condition is not satisfied, the method 500 proceeds to block 522. If, however, at block 518, the second validity condition is satisfied, the method 500 proceeds to block 520 where the UE switches the first service from the WLAN to the 3GPP RAT, after which, the method 500 ends.

Figure 6:
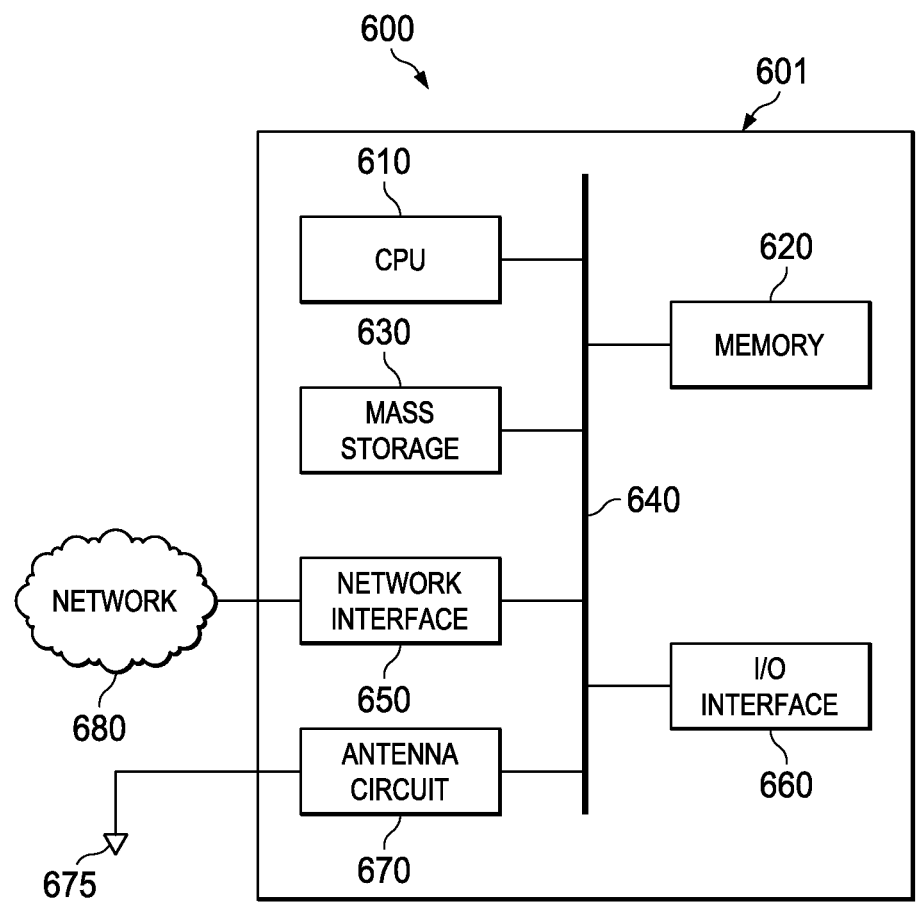
FIG. 6 illustrates a computing platform that may be used for implementing, for example, the devices and methods described herein, in accordance with an embodiment.

FIG. 6 is a block diagram of a processing system 600 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a speaker, microphone, mouse, touchscreen, keypad, keyboard, printer, display, and the like. The processing unit 601 may include a central processing unit (CPU) 610, memory 620, a mass storage device 630, a network interface 650, an I/O interface 660, and an antenna circuit 670 connected to a bus 640. The processing unit 601 also includes an antenna element 675 connected to the antenna circuit.

The bus 640 may be one or more of any type of several bus architectures including a memory bus or memory controller, a peripheral bus, video bus, or the like. The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs.

The mass storage device 630 may comprise any type of storage device configured to store data, programs, and other information and to make the data, programs, and other information accessible via the bus 640. The mass storage device 630 may comprise, for example, one or more of a solid state drive, hard disk drive, a magnetic disk drive, an optical disk drive, or the like.

The I/O interface 660 may provide interfaces to couple external input and output devices to the processing unit 601. The I/O interface 660 may include a video adapter. Examples of input and output devices may include a display coupled to the video adapter and a mouse/keyboard/printer coupled to the I/O interface. Other devices may be coupled to the processing unit 601 and additional or fewer interface cards may be utilized. For example, a serial interface such as Universal Serial Bus (USB) (not shown) may be used to provide an interface for a printer.

The antenna circuit 670 and antenna element 675 may allow the processing unit 601 to communicate with remote units via a network. In an embodiment, the antenna circuit 670 and antenna element 675 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 670 and antenna element 675 may also provide Bluetooth and/or WiFi connection to other devices.

The processing unit 601 may also include one or more network interfaces 650, which may comprise wired links, such as an Ethernet cable or the like, and/or wireless links to access nodes or different networks. The network interface 601 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

The following references are related to subject matter of the present application. Each of these references is incorporated herein by reference in its entirety:

3GPP SA2 specification (23.853).
CT 24.402.
CT 24.312.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a user equipment (UE) for offloading wireless services to a wireless local area network (WLAN) in a Third Generation Partnership Project (3GPP) inter-radio access technology (RAT) handover, the method comprising:
   receiving, at the UE, an access network discovery and selection function (ANDSF) policy from an ANDSF server, wherein the ANDSF policy comprises policy rules, wherein the policy rules comprise a validity condition for applying the rules, wherein the receiving is performed during a procedure in which the UE conducts an inter-RAT handoff from a first 3GPP RAT to a second 3GPP RAT;
   comparing, by the UE, an evaluation condition information for the second 3GPP RAT against the validity condition;
   offloading a first wireless service to the WLAN in accordance with the ANDSF policy when the validity condition is satisfied, wherein the validity condition comprises a first validity condition, wherein the ANDSF policy comprises a second validity condition, wherein the inter-RAT handoff comprises a first inter-RAT handoff; and
   switching, when the second validity condition is satisfied, the first service from the WLAN to one of the second 3GPP RAT, a second WLAN, and a third 3GPP RAT to which the UE is connected after a second inter-RAT handoff.

2. The method of claim 1, wherein the first 3GPP RAT and the second 3GPP RAT comprise different capabilities and different technologies.

3. The method of claim 1, wherein the validity condition comprises at least one of the first and second 3GPP RATs comprise one of a Global System for Mobile Communications (GSM) enhanced data rates for GSM evolution (EDGE) radio access network (GERAN) and a universal mobile telecommunications system (UMTS) terrestrial RAN (UTRAN).

4. The method of claim 1, further comprising determining whether a suitable WLAN network is available and using the second 3GPP RAT for the first wireless service when a suitable WLAN network is not available.

5. The method of claim 1, wherein the validity condition comprises at least one of a quality of service (QoS) requirement, a RAT technologies and capability requirement, connection capability support, quality of service (QoS) class identifier (QCI) support capability, 3GPP policy and charging control (PCC) capability, (QCI) support capability, guaranteed bit rate (GBR), maximum bit rate (MBR), aggregate MBR (AMBR), dual transfer mode (DTM) support, and duration within a selected network before considering a move to another network.

6. The method of claim 1, wherein the policy rules specify an order of preference for wireless access technologies for the first wireless service.

7. The method of claim 1, wherein the first wireless service comprises one of video streaming, audio streaming, data service, texting service, and voice call service.

8. The method of claim 1, wherein the evaluation condition information is determined according to information received from the second 3GPP RAT.

9. The method of claim 1, wherein the evaluation condition information is received from one of the first or second 3GPP RAT.

10. A user equipment (UE) configured for offloading wireless services to a wireless local area network (WLAN) in a Third Generation Partnership Project (3GPP) inter-radio access technology (RAT) handover, the UE comprising:
    a processor; and
    a non-transitory computer readable storage medium storing programming for execution by the processor, the programming including instructions to:
        receive an access network discovery and selection function (ANDSF) policy from an ANDSF server, wherein the ANDSF policy comprises policy rules, wherein the policy rules comprise a validity condition for applying the rules, wherein the instructions to receive the ANDSF are performed during a procedure in which the UE conducts an inter-RAT handoff from a first 3GPP RAT to a second 3GPP RAT;
        compare an evaluation condition information determined for the second 3GPP RAT against the validity condition;
        offload a first wireless service to the WLAN in accordance with the ANDSF policy when the validity condition is satisfied, wherein the validity condition comprises a first validity condition, wherein the ANDSF policy comprises a second validity condition, wherein the inter-RAT handoff comprises a first inter-RAT handoff; and
        instructions to switch, when the second validity condition is satisfied, the first service from the WLAN to one of the second 3GPP RAT, a second WLAN, and a third 3GPP RAT to which the UE is connected after a second inter-RAT handoff.

11. The UE of claim 10, wherein the first 3GPP RAT and the second 3GPP RAT comprise at least one of different capabilities and different technologies.

12. The UE of claim 10, wherein the validity condition comprises at least one of the first and second 3GPP RATs comprise one of a Global System for Mobile Communications (GSM) enhanced data rates for GSM evolution (EDGE) radio access network (GERAN) and a universal mobile telecommunications system (UMTS) terrestrial RAN (UTRAN).

13. The UE of claim 10, wherein the programming further comprises instructions to determine whether a suitable WLAN network is available and instructions to use the second 3GPP RAT for the first wireless service when a suitable WLAN network is not available.

14. The UE of claim 10, wherein the validity condition comprises at least one of a quality of service (QoS) requirement, a RAT technologies and capability requirement, connection capability support, quality of service (QoS) class identifier (QCI) support capability, 3GPP policy and charging control (PCC) capability, (QCI) support capability, guaranteed bit rate (GBR), maximum bit rate (MBR), aggregate MBR (AMBR), dual transfer mode (DTM) support, and duration within a selected network before considering a move to another network.

15. The UE of claim 10, wherein the policy rules specify an order of preference for wireless access technologies for the first wireless service.

16. The UE of claim 10, wherein the first wireless service comprises one of video streaming, audio streaming, data service, texting service, and voice call service.

17. The UE of claim 10, wherein the evaluation condition information is determined according to information received from the second 3GPP RAT.

18. The UE of claim 10, wherein the evaluation condition information is received from one of the first or second 3GPP RAT.

\* \* \* \* \*